United States Patent [19]
Langenberg

[11] 3,871,932
[45] Mar. 18, 1975

[54] METHOD OF CONNECTING INSULATED CONDUCTORS
[75] Inventor: Earl G. Langenberg, New York, N.Y.
[73] Assignee: The Anaconda Company, New York, N.Y.
[22] Filed: Mar. 2, 1973
[21] Appl. No.: 337,350

[52] U.S. Cl.................. 156/49, 29/628, 29/630 F, 156/159, 174/84 C
[51] Int. Cl.......................... H01r 5/08, B21f 15/02
[58] Field of Search........... 156/49, 50, 51, 91, 158, 156/211, 227, 294, 304, 159; 174/84 C, 84 R, 90, 94 R; 29/628, 629, 630 F

[56] References Cited
UNITED STATES PATENTS

| | | |
|---|---|---|
| 2,883,220 | 4/1959 | Johnson............................ 174/84 C |
| 2,889,603 | 6/1959 | Joy et al. ............................. 174/90 |
| 2,930,113 | 3/1960 | Greco................................ 29/630 F |
| 2,963,392 | 12/1960 | Dahlgren .............................. 156/49 |
| 3,124,641 | 3/1964 | Anderson.......................... 174/84 C |
| 3,231,964 | 2/1966 | Bennett............................. 174/84 C |

Primary Examiner—Charles E. Van Horn
Assistant Examiner—Basil J. Lewris
Attorney, Agent, or Firm—Victor F. Volk

[57] ABSTRACT

Two insulated conductors, such as the ground check conductors of mining machine cables, are connected by stripping the insulation from a length of each conductor, folding back both lengths and compressing a metal sleeve over both of the stripped lengths and both of the insulated conductors.

4 Claims, 6 Drawing Figures

METHOD OF CONNECTING INSULATED CONDUCTORS

BACKGROUND OF THE INVENTION

Many types of electrical cords and cables that are used in service subjecting them to repeated flexings and elongations have conductors that comprise strand constructions and metals selected to endure for long periods of such service. Ideally these cords or cables should be kept free from splices but when they are used in applications that require very long lengths, and/or under conditions that require failures to be repaired, either to prevent an interruption in service or to save the high cost of replacing a long cable, splices become unavoidable.

In U.S. Pat. No. 3,699,238, the disclosures of which are included herein by reference, a mining machine cable is described comprising a ground check wire which is required to retain electrical continuity after the remaining conductors of the cable have failed from repeated flexing and stretching. The unspliced ground check wire meets this requirement consistantly but, before the present invention, no method was known for making a splice in the ground check wire that would outlive the splices in the remaining, larger, conductors of the cables.

SUMMARY

I have invented a method of splicing together two insulated conductors each comprising a metallic strand and a tubular wall of insulation surrounding the strand by which I am able to produce a connection capable of withstanding a large number of repeated flexings and tensionings.

My method is inexpensive and can be practiced by persons who have not acquired special skills in splicing.

By means of my method cable connections can be made very rapidly, an important feature where a costly operation, such as the operation of mining machines, has been interrupted by a cable failure.

My method is practiced with apparatus and connector elements that are generally and readily available from commercial sources.

My method results in a compact connection with the result that conductors connected by my method can be comprised in a cable joint without unduly increasing the diameter of the joint.

In my method, which is particularly advantageous for connecting insulated conductors comprising a strand having a plurality of wires wound in a short lay-length around a resiliently stretchable tensile member, I strip lengths of the walls of insulation from the ends of two insulated conductors thereby forming newly cut end faces in each of these walls and exposing end lengths of each of the conducting strands, that preferably, are substantially equal. I then fold back each of the end lengths against the outer surface of its wall of insulation, overlay the ends of the conductors so that substantial sections of the folded-back end lengths of the two conductors are coextensive and, preferably, the end of the strand of each conductor is substantially adjacent to the cut face of the wall of insulation of the other conductor. Finally, I fit a metal ferrule around both of the insulated conductors and both of the folded-back exposed strands while leaving portions, preferably exceeding their diameter, of each of the end lengths outside of both ends of the ferrule, which is shorter than the shortest end length, and crimp the ferrule down upon the end lengths of the strands and upon the insulated conductors.

DETAILED DESCRIPTION OF PREFERRED EMBODIMENT

Figure 1:
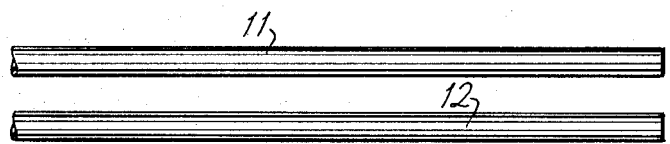
FIGS. 1-6 show steps of the method of my invention.
Figure 2:
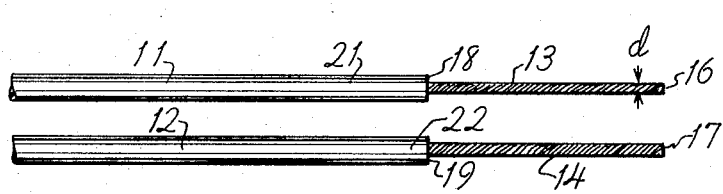
Figure 3:
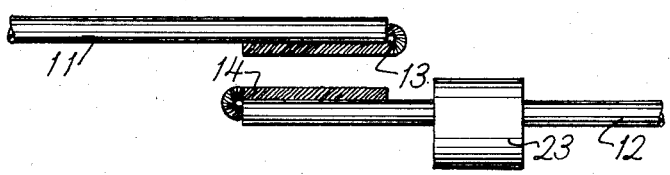
Figure 4:
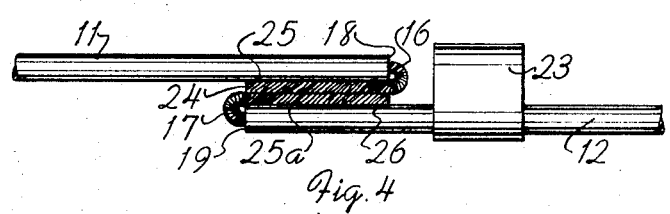
Figure 5:
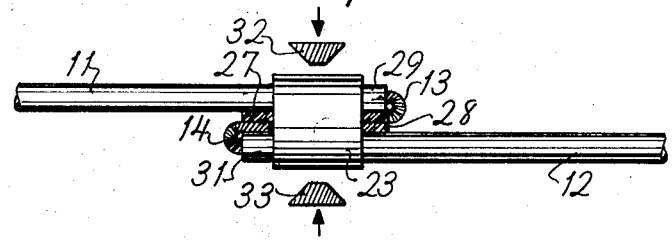
Figure 6:
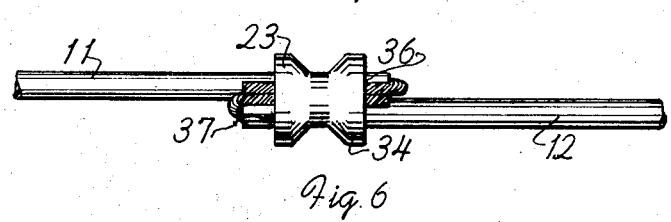

Referring to FIG. 1, two insulated conductors 11, 12 of indefinite length are to be connected. For this purpose equal lengths of the walls of insulation are stripped from both conductors as shown in FIG. 2 leaving end lengths 13, 14 of the bared strands 16, 17 and cut insulation faces 18, 19 of respective insulation walls 21, 22. The walls of insulation 21, 22 have outer cylindrical surfaces against which, as shown in FIG. 3 I fold back the cut end lengths 13, 14. Before joining the conductors 11, 12 a metal ferrule 23 is fitted over one of the conductors which are then brought together with the end lengths 13, 14 in lengthwise contact (FIG. 4) and an end 24 of the strand 16 adjacent the face 19 while and end 26 of the strand 17 is adjacent the face 18. This results in a preferred balanced splice structure, but in any event substantial sections 25, 25a of the folded-back end lengths 13, 14 must be mutually coextensive. The ferrule 23 is then positioned to surround the insulations 21, 22 and coextensive sections 25, 25a of the end lengths 13, 14. The ferrule 23 is shorter than the sections 25, 25a and is centered over them so as to leave portions 27, 28 extending out of the ferrule. Since the end 26 is adjacent the face 18 and the end 24 is adjacent the face 19 ends 29, 31 of the insulation will also necessarily extend out of the ferrule 23. A crimping tool indicated by facing anvils 32, 33 is centered over the ferrule 23 and operated to form a center crimp 34 in the ferrule as shown in FIG. 6. The crimp 34 should center to provide flared openings 36, 37 in the crimped ferrule and the depth of the crimp should be no greater than the depth necessary to hold the conductors firmly against separation. Too deep a crimp will have a deleterious effect on the flex life of the splice. It is essential for the successful practice of my splicing method that the projecting portions 27, 28 and 29, 31 should be substantial and in no case fail to exceed the diameter, d (FIG. 2), of the strands. For example, to splice the gound check wire of U.S. Pat. No. 3,699,238, above named, having an extensible strand with an outside diameter of 0.095 inch and polypropylene insulation for a conductor diameter of 0.160 inch, I leave end portions 27, 28, 29, 31 of 0.125 inch, substantially exceeding the strand diameter.

To evaluate the improvement afforded by my new method of making connections the above-mentioned ground check conductor was spliced by conventional techniques and tested, along with a splice of the present invention by repeated reverse bending of 90° over 2-inch diameter mandrels while supporting a six-pound weight. In each case the splice was positioned to bend directly across the mandrels. The following standard commercial connectors were used in the evaluation.

Connector A: conductors laid parallel within a rectangular plastic housing. Strands connected by means of a double-slotted, insulation-piercing blade.

Connector B: conductors stripped and strands inserted end to end into a thick-walled, metal ferrule and crimped.

Connector C: similar to B but with metal shell and rigid plastic tube covering and extending beyond both ends of the ferrule.

Connector D: similar to C with metal shells at each end but absent the plastic tube.

Connector E: similar to C with plastic tube but absent the metal shell.

The results of this flexing test are given in TABLE I.

TABLE I

| connector | number of bending cycles to failure |
| --- | --- |
| A | 25 |
| B | 323 |
| C | 612 |
| D | 950 |
| E | 651 |
| present method | 59,600 |

Table I illustrates a surprising improvement in flex life accomplished by the present method.

The method has particular advantage for joining flexible mining machines of the type described in the aforementioned U.S. Pat. No. 3,699,238 inasmuch as it enables the spliced ground check strand to outlast the splices in the grounding and phase conductors of the cable.

Joints in three-conductor mining machine cable were made as follows to test the ability of the new splice method to make a connection in the ground-check-conductor that would outlast the other conductor splices in the cable. The splices in the phase conductors were staggered for stress relief. The connection in one of the phase conductors was made by brazing and the other two connections were made with commercial crimped sleeve connectors. Two of the connections in the grounding conductors were butt brazed and one was made with a commercial crimped sleeve. The center ground check conductor was joined by the method of the present invention. Conventional taped insulation was applied over the splices and a jacket molded overall following conventional procedures for joining mining machine cables. A 30-foot length of the cable, with the joint 10 feet from one end was tested by alternately and repeatedly paying the cable off one 24-inch diameter reel and taking it upon another over an 18-inch diameter sheave until the joint failed by the opening of two of the phase conductors and the grounding conductors. The splice in the ground check conductor remained intact with no signs of wear.

The foregoing description of my new method of connecting insulated conductors has been exemplary rather than definitive of my invention for which I desire an award of Letters Patent as defined in the appended claims.

I claim:

1. The method of splicing together first and second insulated conductors, each comprising a metallic strand and a tubular wall of insulation surrounding said strand, said wall having an outer peripheral surface, comprising the steps of:

A. stripping lengths of said walls of insulation from the ends of each of said insulated conductors, thereby forming newly cut end faces in each of said walls and exposing end lengths of each of said strands,
   B. folding back each of said end lengths against said surface of the wall of insulation of its respective insulated conductor,
   C. overlaying the ends of said insulated conductors so that a substantial section of the folded back end length of the strand of one insulated conductor is coextensive with a substantial section of the folded-back end length of the other insulated conductor,
   D. fitting a metal ferrule around said first and second insulated conductors and both of the folded-back exposed strands while leaving both a substantial insulated portion and a substantial exposed strand portion of each insulated conductor projecting from each end of said ferrule,
   E. crimping said ferrule down upon both exposed end lengths of said insulated conductors and said surfaces so as to provide flared openings of said ferrule at both ends thereof, thereby holding said conductors firmly against separation.

2. The method of claim 1 wherein each of said strands comprises a plurality of wires wound in a short lay-length around a resiliently stretchable tensile member.

3. The method of claim 1 wherein said portions each exceeds the diameter of one of said strands.

4. The method of claim 1 wherein substantially equal lengths of said strands are exposed and the strand of each insulated conductor is overlaid substantially adjacent to the cut face of the wall of insulation of the other insulated conductor.

* * * * *